J. G. BURCH.
DEVICE FOR CUTTING WIRE CABLE.
APPLICATION FILED AUG. 25, 1919.
1,374,278.
Patented Apr. 12, 1921.
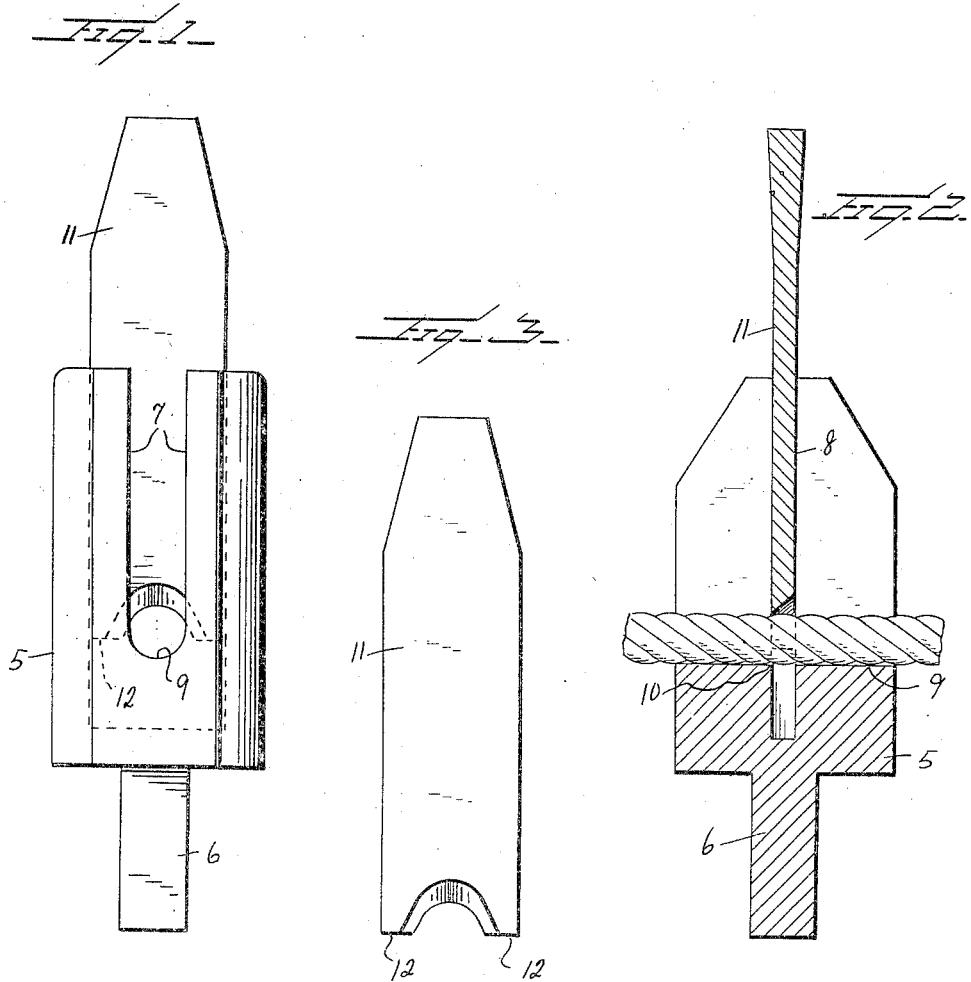
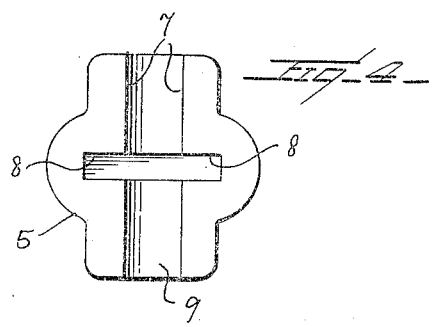
Inventor
J. G. Burch
By Watson E. Coleman
Attorney

UNITED STATES PATENT OFFICE.

JULIUS GORDON BURCH, OF BARTLESVILLE, OKLAHOMA.

DEVICE FOR CUTTING WIRE CABLE.

1,374,278. Specification of Letters Patent. Patented Apr. 12, 1921.

Application filed August 25, 1919. Serial No. 319,649.

*To all whom it may concern:*

Be it known that I, JULIUS GORDON BURCH, a citizen of the United States, residing at Bartlesville, in the county of Washington and State of Oklahoma, have invented certain new and useful Improvements in Devices for Cutting Wire Cable, of which the following is a specification, reference being had to the accompanying drawings.

This invention relates to improvements in devices for cutting wire cable and like material and has for its object to provide a device of this character adapted to be easily positioned on an anvil to provide a solid foundation necessary in cutting operations involving material such as cable.

Another object is to provide a cutting device which eliminates all adjustments and includes a cutting means only one edge of which requires resharpening when dulled from constant use.

A still further object is to provide a novel form of cutting means having abutments formed on a part of its cutting edge, to prevent dulling of the cutting edge by contact with the member holding the material.

With these and other objects in view, the invention consists of certain novel and simple features of construction which will be more fully described and claimed:

In the drawings:

Figure 1 is a front elevation of the receiving member with the cutter in position;

Fig. 2 is a transverse sectional view of the receiving member and cutter;

Fig. 3 is a detail view of the cutter showing the means for preventing the cutting edge from coming into contact with the receiving member; and Fig. 4 is a top plan view of the receiving member with the cutter removed.

This improved cutting device comprises a receiving member 5 the bottom of which is intended to engage the upper surface of an anvil, and includes a shank 6 which extends downwardly and is constructed to engage the conventional tool receiving opening provided in anvils. The upper portion of the receiving member is furcated to provide resultant walls 7. The inner sides of these walls are provided with grooves 8 which extend the length of the walls and merge and penetrate the lower portion of the receiving member. The resultant base 9 formed by the furcation is also grooved. The edge 10 formed by the merged groove and resultant base formed by the furcation serves as a cutting edge.

Slidably mounted in the grooves 8 of the walls 7 is a cutting member 11 one end of which is provided with a U-shaped cutting edge or cutting surface, one portion of said surface being beveled to provide a cutting edge. The ends formed by the U-shaped cutting edge are flattened to provide a substantial abutment intended to engage the lower portion of the receiving member after the cutting operation to prevent contact of the cutting edge with the receiving member.

In operation the receiving member is placed on an anvil with the shank positioned in the tool opening provided in the anvil. The material to be cut is placed in the furcation, while the cutting member is inserted in the grooves 8 formed in the walls 7. A blow is then struck on the end of the cutting member causing coöperation between the U-shaped cutting edge and the cutting edge 10 of the receiving member, thereby causing a clean cut and eliminating frayed ends. The flattened ends 12 of the cutting member 11 engage the receiving member below the base of the furcation and are of sufficient substantial construction to absorb any blow which would tend to bring the cutting edge into contact with the receiving member.

What is claimed as new is:

In a device for cutting cable, a member furcated to form spaced side walls adapted to receive therebetween said member being provided with a cable, a rigid arcuately curved base upon which the cable rests, the side walls having registering grooves formed therein, the base having formed therein a recess connecting the lower ends of said grooves, said recess combining with the base to form at one end thereof a cutting edge and a cutting member slidably mounted in said grooves and slidably engaging with one of its side faces the cutting edge of said base, said cutting member having the lower edge thereof tapering downwardly toward the last named face to provide a cutting edge coacting with the cutting edge of said base.

In testimony whereof I hereunto affix my signature.

JULIUS GORDON BURCH.